Oct. 29, 1974

L. S. EUBANKS ET AL  3,845,121
PROCESS FOR SEPARATING CARBONYLATION PRODUCTS FROM REACTION
MIXTURE WITHOUT CATALYST DECOMPOSITION
Filed Nov. 10, 1971

INVENTORS
LLOYD S. EUBANKS
ROY T. EBY
CARL M. CRUSE
HENRY L. EPSTEIN
HAROLD R. NULL
FREDERICK E. ROSENBERGER

BY L. Dan Tucker

ATTORNEY

United States Patent Office 3,845,121
Patented Oct. 29, 1974

3,845,121
PROCESS FOR SEPARATING CARBONYLATION PRODUCTS FROM REACTION MIXTURE WITHOUT CATALYST DECOMPOSITION
Lloyd S. Eubanks and Roy T. Eby, Texas City, Carl M. Cruse, Dickinson, and Henry L. Epstein, Clear Lake, Tex., and Harold R. Null, Creve Coeur, and Frederick E. Rosenberger, Des Peres, Mo., assignors to Monsanto Company, St. Louis, Mo.
Filed Nov. 10, 1971, Ser. No. 196,007
Int. Cl. C07c 51/14, 51/12, 67/00
U.S. Cl. 260—532
10 Claims

ABSTRACT OF THE DISCLOSURE

The present invention provides for an improved process wherein an olefin, an alcohol, or an ester, halide or ether derivative of said alcohol is reacted with carbon monoxide in a liquid phase in the presence of a catalyst system that contains (a) a rhodium or iridium component, and (b) an iodine or bromine component. By passing at least a portion of the liquid reaction mass from the reaction zone to a separation zone of substantially lower pressure, without the addition of heat, at least a portion of the carbonylation products are vaporized and can be withdrawn from the separation zone. As a result, the catalyst system can be maintained in the liquid phase and recycled to the reaction zone.

BACKGROUND OF THE INVENTION

The present invention relates to a carbonylation process improvement. More particularly, this invention relates to an improved process scheme wherein at least a portion of the reaction mass from a carbonylation process can be withdrawn from the reactor and separated without decomposing the catalyst system.

Recently, processes for producing carboxylic acids and esters by carbonylating olefins, alcohols, esters, halides and ethers in the presence of homogeneous catalyst systems that contain rhodium or iridium and halogen components such as iodine components and bromine components have been disclosed and placed into commercial operations. These recently developed processes represent a distinct improvement over the classic carbonylation processes wherein such feed materials have been previously carbonylated in the presence of such catalyst systems as phosphoric acid, phosphates, activated carbon, heavy metal salts and metal carbonyls such as cobalt carbonyl, iron carbonyl and nickel carbonyl. All of these previously known processes require the use of extremely high partial pressures of carbon monoxide. These previously known carbonylation systems also have distinct disadvantages in that they require higher catalyst concentrations, longer reaction times, higher temperatures to obtain substantial reaction and conversion rates that all result in larger and more costly processing equipment and higher manufacturing costs.

The discovery that rhodium or iridium and iodine or bromine containing catalyst systems will carbonylate such feed materials as olefins, alcohols and ester, halide or ether derivatives of the alcohols at relatively mild pressure and temperature conditions was a distinct contribution to the carbonylation art. In spite of the vast superiority of these newly developed catalyst systems, it has been found that conventional processing schemes for separation of the carbonylation products from the liquid reaction mass has posed problems of catalyst inactivation and precipitation.

By utilizing conventional processing schemes, effluent from the reaction zone, that contains the carbonylation products, the liquid catalyst system and unreacted feed components has been subjected to a distillation step to recover the crude carbonylation products that can be later purified. It has been found that the newly developed catalyst systems utilized in such carbonylation processes are quite sensitive to heat and tend to decompose and become inactive when they come into contact with the hot surfaces in distillation column reboilers. One method for reducing such decomposition is to utilize extremely large distillation column reboilers whereby the surface temperature in the reboilers is relatively cool. By using such relatively cool reboiler surfaces, the problem of catalyst system decomposition can be alleviated to some extent. However, the use of such large reboilers still results in some catalyst system decomposition and proves to be quite costly from an initial investment standpoint as well as from a maintenance standpoint.

It is, therefore, an object of this invention to provide an improved process scheme wherein carbonylation products can be recovered from a carbonylation reaction zone.

A further object of the present invention is to provide a new and improved method for separating carbonylation product from a rhodium or iridium containing catalyst system without causing the catalyst system to decompose.

Still a further object of the present invention is to provide an improved process scheme whereby carbonylation products from a liquid phase carbonylation process utilizing a liquid phase rhodium or iridium containing catalyst system can be recovered without decomposing the catalyst system with the recycle of the liquid phase active catalyst system and unreacted feed components to the reaction zone.

Additional objects of the present invention will become apparent from the following discussion of the invention.

SUMMARY OF THE INVENTION

The present invention, which fulfills these and other objects, is an improvement in a carbonylation process wherein an olefin, an alcohol, or an ester, halide or ether derivative of said alcohol is reacted with carbon monoxide in a liquid phase in the presence of a catalyst system that contains (a) a rhodium or iridium component, and (b) an iodine or bromine component whereby the carbonylation products are separated from the liquid reaction mass without the addition of heat. By withdrawing a portion of the liquid reaction mass from the reactor and passing it to a separation zone of substantially lower pressure, without the addition of heat, at least a portion of the carbonylation products can be vaporized and passed on to purification equipment without decomposing the carbonylation catalyst system. According to our invention, the carbonylation reaction is carried out in the reaction zone at a temperature of from about 50° to about 500° C. and a pressure of from about 50 to about 1500 p.s.i.a. By withdrawing a portion of the liquid reaction mass and passing it to a separation zone that is maintained at a pressure that is substantially lower than the pressure in the reactor, we have found that at least a portion of the carbonylation products will vaporize without a substantial decomposition of the liquid catalyst system. This vaporization will take place without the additon of heat to the reacton mass.

As a result of this improved process, little or none of the valuable catalyst decomposes and precipitates from the reaction mass. The unvaporized liquid in the separation zone containing the stable homogeneous catalyst system can be recycled to the reactor.

DESCRIPTION OF THE PREFERRED EMBODIMENTS

Our invention is directed to the recently developed carbonylation processes wherein olefins, alcohols and ester, halide and ether derivatives of the alcohols are reacted with carbon monoxide in a liquid phase system in the presence of a homogeneous catalyst system that contains (a) a rhodium or iridium component, and (b) an iodine or bromine component.

Our invention solves the catalyst inactivation and precipitation problems in the separation of the carbonylation products from the liquid reaction mass by withdrawing at least a portion of the liquid reaction mass from the reactor and passing it to a separation zone that is maintained at a substantially lower pressure without the addition of heat. This results in the vaporization of at least a portion of the carbonylation products, which are then withdrawn from the separation zone in vapor form, without causing a decomposition and precipitation of the homogeneous catalyst system. The unvaporized liquid in the separation zone containing the stable catalyst system can then be returned to the reactor for reuse in the carbonylation process.

When we refer to the "catalyst system" throughout this disclosure of our invention, we mean a catalyst system that forms on combining two distinct components in the presence of carbon monoxide. The two essential catalyst precursor materials are (a) a rhodium or iridium component, and (b) an iodine or bromine component.

The rhodium or iridium component referred to above can be almost any rhodium or iridium component. The rhodium or iridium precursor material can be rhodium or iridium metal or any compound of these metals such as their salts, oxides, carbonyls, complexes or coordination compounds thereof. The terms "complex" and "coordination compound" as employed herein mean a compound or complex formed by combination of one or more electronically rich molecules or atoms capable of independent existence with one or more electronically poor molecules or atoms which may also be capable of independent existence. Among the large number of suitable rhodium or iridium components are, for example, those mentioned in the following non-limiting list of precursor materials:

| | |
|---|---|
| RhCl₃ | [(n-C₄H₉)₄N][Rh(CO)₂X₂] where X= Cl⁻, Br⁻, I⁻ |
| RhBr₃ | [(n-C₄H₉)₄As]₂[Rh₂(CO)₂Y₄] where Y= Br⁻, I⁻ |
| RhI₃ | [(n-C₄H₉)₄P][Rh(CO)I₄] |
| RhCl₃·3H₂O | Rh[(C₆H₅)₃P]₂(CO)I₄] |
| RhBr₃·3H₂O | Rh[(n-C₄H₉)₃P]₂(CO)Br |
| Rh(CO)₂(I)₂ | Rh(CO)I₄ |
| Rh₂(CO)₃Cl₂ | Rh[(n-C₄H₉)₃P]₂(CO)I |
| Rh₂(CO)₃Br₂ | RhBr[(C₆H₅)₃P]₃ |
| Rh₂(CO)₄I₂ | RhI[(C₆H₅)₃P]₃ |
| Rh₂(CO)₈ | RhCl[(C₆H₅)₃P]₃ |
| Rh[(C₆H₅)₃P]₂(CO)I | RhCl[(C₆H₅)₃P]₃H₂ |
| Rh[(C₆H₅)₃P]₂(CO)Cl | [(C₆H₅)P]₃Rh(CO)H |
| Rh metal | Rh₂O₃ |
| Rh(NO₃)₃ | |
| RhCl[(C₆H₅)₃P]₂(CH₃I)₂ | [Rh(C₂H₄)₂Cl]₂ |
| Rh(SnCl₃)₃[(C₆H₅)₃P]₃ | K₄Rh₂(SnCl₃)₄ |
| RhCl(CO)[(C₆H₅)₃As]₂ | K₄Rh₂Br₂(SnBr₃)₄ |
| RhI(CO)[(C₆H₅)₃Sb]₂ | K₄Rh₂I₂(SnI₃)₄ |
| IrCl₃ | [(n-C₄H₉)₄N][Ir(CO)₂X₂ where X=Cl⁻, Br⁻, I⁻ |
| IrBr₃ | [(n-C₄H₉)₄As]₂[Ir₂(CO)₂Y₄] where Y= Br⁻, I⁻ |
| IrI₃ | [(n-C₅H₉)₄P][Ir(CO)I₄] |
| IrCl₃·3H₂O | Ir[(C₆H₅)₃P]₂(CO)Br |
| IrBr₃·3H₂O | Ir[(n-C₄H₉)₃P]₂(CO)Br |
| Ir(CO)₂(I)₂ | Ir(CO)I₄ |
| Ir₂(CO)₄Cl₂ | Ir[(n-C₄H₉)₃P]₂(CO)I |
| Ir₂(CO)₄Br₂ | IrBr[(C₆H₅)₃P]₃ |
| Ir₂(CO)₄I₂ | IrI[(C₆H₅)₃P]₃ |
| Ir₂(CO)₈ | IrCl[(C₆H₅)₃P]₃ |
| Ir[(C₆H₅)₃P]₂(CO)I | IrCl[(C₆H₅)₃P]₃H₂ |
| Ir[(C₆H₅)₃P]₂(CO)Cl | [(C₆H₅)P]₃Ir(CO)H |
| Ir metal | Ir₂O₃ |
| Ir(NO₃)₃ | |
| IrCl[(C₆H₅)₃P]₂(CH₃I)₂ | [Ir(C₂H₄)₂Cl]₂ |
| Ir(SnCl₃)[(C₆H₅)₃P]₃ | K₄Ir₂Cl₂(SnCl₃)₄ |
| IrCl(CO)[(C₆H₅)₃As]₂ | K₄Ir₂Br₂(SnBr₃)₄ |
| IrI(CO)[(C₆H₅)₃Sb]₂ | K₄Ir₂I₂(SnI₃)₄ |

The iodine or bromine precursor component of the catalyst system used herein may be in combined form with the rhodium or iridium as, for instance, one or more ligands in a coordination compound of the rhodium or iridium. However, it is generally preferred to have an excess of the iodine or bromine present in the reaction system over the iodine or bromine that exists as ligands of the rhodium or iridium compounds. The bromine or iodine precursor can be in the form of elemental bromine or iodine as well as combinations of bromine or iodine such as hydrogen iodide, hydrogen bromide, alkyl iodide, alkyl bromide, aryl iodide, aryl bromide, iodide salts, bromide salts and the like. Suitable non-limiting examples of such compounds of bromine and iodine include methyl iodide, methyl bromide, ethyl iodide, ethyl bromide, phenyl iodide, phenyl bromide, benzyl iodide, benzyl bromide, sodium iodide, potassium iodide, sodium bromide, potassium bromide, ammonium iodide, ammonium bromide and the like.

Generally, it is preferred that the amount of iodine precursor material added to the reaction system will be in an amount such that the atomic ratio of the iodine or bromine to the rhodium or iridium is above 2:1. Preferably, the atomic ratio of the iodine or bromine to the rhodium or iridium will be in a range of 5:1 to 5000:1. A more preferred atomic ratio of the iodine or bromine to the rhodium or iridium is 10:1 to 2500:1.

The catalyst system forms my combining the foregoing metal and halogen components in the presence of carbon monoxide in a liquid reaction medium. The liquid reaction medium employed may include any solvent compatible with the catalyst system and may include pure alcohols, or mixtures of the alcohol feedstock and/or the desired carboxylic acid and/or esters of these two compounds. However, the preferred solvent or liquid reaction medium for the process of this invention is the desired carbonylation products such as the carboxylic acid and/or ester of the acid and an alcohol. Water is also often in the reaction mixture to exert a beneficial effect upon the reaction rate.

Suitable feedstock materials that are utilized in our invention include ethylenically unsaturated compounds having from 2 to 30 carbon atoms. Such ethylenically unsaturated compounds include by way of non-limiting examples: ethylene, propylene, butene-1, butene-2, hexenes, octenes, dodecenes, hexadecene, 2-methylpropene, 1,3-butadiene, 2-methyl-1,3-butadiene, 2,3-dimethyl-1,3-butadiene, cyclohexene, methylcyclohexene, styrene, methylstyrene, vinylcyclohexene, 3,3-dimethyl-1-butene, 1,4-hexadiene, 2,4-hexadiene, 1,5-hexadiene, 2-methyl-1,4-hexadiene, acrolein, methyl vinyl ketone, allyl alcohol, 2-phenylbutene, cyclopentadiene, 2-cyclohexyl-butene, allene, allylamine, diallylamine, acrylonitrile, methyl acrylate, vinyl chloride, phosphopyruvic acid and mixtures thereof.

Suitable alcohol and alcohol derivative feedstocks include compounds having the following structural formulas:

ROH wherein R is a hydrocarbon radical of 1 to 20 carbon atoms,

R'—O—R' wherein R' is a hydrocarbon radical of 1 to 19 carbon atoms and wherein the total number of carbon atoms in the compound does not exceed 20,

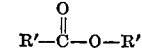

wherein R' is a hydrocarbon radical of 1 to 19 carbon atoms and wherein the total number of carbon atoms in the compound does not exceed 20, R—X wherein R is a hydrocarbon radical of 1 to 20 carbon atoms and X is a halogen which is chloride, bromine or iodine.

The hydrocarbon radicals in the above compounds include straight-chain, branched chain, aromatic and cyclic radicals and generally contain one carbon atom less than that of the desired acid. Included within these feed materials are such specific compounds as methanol, ethanol, propanol and isopropanol, the butanols, pentanols, hexanols, cyclohexanols, cyclopentanols and also the higher alcohols such as the decanols, dodecanols, hexadecanols, nonadecanols, and including isomeric forms, methyl ether, ethyl ether, n-propyl ether, isopropyl ether, n-butyl ether, methyl acetate, ethyl acetate, pentyl acetate, methyl iodide, ethyl iodide, methyl chloride, propyl bromide, heptyl iodide, phenol, benzyl alcohol, alpha-phenylethyl alcohol, methylbenzyl alcohol, benzyl iodide, benzyl acetate, methylbenzyl alcohol and the like.

Polyhydroxy compounds such as glycols also serve as suitable feedstocks in the recently developed carbonylation reactions that our invention is directed to. Such polyhydroxy compounds fall within our definition of the term "alcohols" as used herein. Ester, ether, and halide derivatives of such glycols are also suitable feedstock materials. The glycols include both aliphatic glycols having 2 to 20 carbon atoms as well as aromatic glycols having 6 to 20 carbon atoms. Non-limiting glycols and their derivatives include 1,3-propanediol, 1,4-butanediol, 1,8-octanediol, tetrahydrofuran, 1,4-dibromobutane, 1,6-diiodohexane, 1,4-butaneglycol diacetate, 1,3-dibromobutane, 1,4-dichlorobutane, paradiiodobenzene, 1,5-dichlorooctane, catechol, resorcinol, quinol, pyrogallol, phloroglucinol, hydroquinone, 1,2-ethylene glycol, 1,2-propylene glycol, 2-methoxyethanol, 1,2-dimethoxyethane, ethylene chlorohydrin and the like.

Methanol and ethylene are two of the most preferred feedstocks that are utilized in the practice of our invention.

In carrying out the carbonylation reaction, the above-mentioned feedstocks are intimately contacted with carbon monoxide in a liquid reaction medium that contains the above-mentioned catalyst system. The catalyst system can be preformed outside of the reactor by combining the necessary catalyst precursors or it can be formed *in situ*. Generally, the catalyst will be employed in such amounts as to provide a concentration of soluble rhodium or iridium in the reaction medium of from about 10 p.p.m. to about 3000 p.p.m. depending upon the equipment size, desired reaction time and other factors. The carbon monoxide reactant can be sparged into the reactor in such a manner as to intimately contact the carbon monoxide with the reactants in the reaction mass. The pressure in the reactor will generally be maintained in the range of from about 50 to about 1500 p.s.i.a. As disclosed in the prior art, the foregoing known carbonylation process is carried out at a temperature in the range of about 50° to about 500° C., with a preferred temperature range of from about 100° to about 250° C. The optimum temperature and pressure maintained in the reactor will vary depending upon the reactants and the particular catalyst system utilized. The catalyst, feedstock materials and general reaction parameters set out in the foregoing discussion are known in the art.

In carrying out our invention, a portion of the liquid phase reaction mass is withdrawn from the reactor and passed to a separation zone that is maintained at a pressure that is lower than the reactor pressure without the addition of heat. This pressure let-down will cause at least a portion of the carbonylation products to vaporize and separate from the unvaporized residue of the liquid reaction mass. The aforementioned catalyst system will remain in this residue of unvaporized liquid reaction mass and can be recycled to the reactor without inactivation or precipitation.

Generally, we prefer that the separation zone be maintained at a pressure of at least 20 p.s.i. lower than the pressure in the reactor. The pressure in the reactor is usually in the range of about 50 to 1500 p.s.i.a. Thus, the separation zone is maintained at a pressure less than 1480 p.s.i.a. We have found that the separation zone can be maintained at very low pressures, even approaching a complete vacuum, without decomposition of the homogeneous catalyst system. However, it is usually desirable that the separation zone be maintained at a positive pressure to eliminate vapor compression equipment and the like in handling the vaporized carbonylation products that are withdrawn from the separation zone. By maintaining pressure differential of at least 20 p.s.i. between the reactor and the separation zone, a substantial amount of the carbonylation products can be vaporized from the liquid reaction mass. It is important that no additional heat be applied to the liquid reaction mass because we have found catalyst inactivation and precipitation occurs at the point that heat is added to the liquid reaction mass.

The exact pressure of the separation zone will vary, depending on the temperature and pressure maintained in the reactor. It is important that the pressure differential between the separation zone and the reactor be at least 20 p.s.i. to insure vaporization of a substantial portion of the carbonylation products in the separation zone. It is also important that the total pressure in the separation zone be less than the vapor pressure of the carbonylation products in the liquid reaction mass withdrawn from the reactor at the temperature of said liquid reaction mass. For example, if at the temperature and pressure of the reactor the carbonylation products to be vaporized have a vapor pressure of 200 p.s.i.a., the separation zone should be operated at a pressure of less than 180 p.s.i.a. Preferably, the separation zone of our invention will be operated at a pressure of from about 10 to 200 p.s.i.a. Most preferably, the separation zone must be operated at a pressure of about 15 to 100 p.s.i.a.

The separation zone should be large enough to allow the liquid reaction mass that is passed to it from the reactor to be maintained in said separation zone for a sufficient period of time to vaporize the desired carbonylation products, prior to recycling the unvaporized liquid containing the homogeneous catalyst system back to the reactor. Usually, a residence time of at least one minute in the separation zone is sufficient.

To further describe the present invention, reference is made to the accompanying drawing. This drawing represents a schematic diagram of the process of our invention wherein methanol is carbonylated in the presence of a rhodium and iridium containing catalyst system. By way of example, the catalyst system can be formed by introducing rhodium iodide and hydrogen iodide into reactor 10 that has been partially filled with acetic acid and water as a reaction medium. Carbon monoxide can be sparged into the reactor through line 11. Methanol feed is introduced into the reactor through line 12. The reactor is maintained at a temperature of from about 325 to 425° F. and the pressure in the reactor is maintained at a pressure of from about 200 to 750 p.s.i.g. Unreacted carbon monoxide, along with any gaseous impurities or by-products can be withdrawn from the reactor through line 13.

In carrying out our invention, a portion of the liquid reaction mass is withdrawn from reactor 10 through line 14. Pressure let-down valve 15 is disposed in line 14 to let the pressure down at least 20 p.s.i. as it enters separation zone 16. As the reaction mass enters separation zone 16, a portion of the carbonylation products vaporize and can be withdrawn from the separation zone through line 17. These vaporized products can be then passed to other purification equipment where they can be further purified by well known techniques such as by distillation. The remaining liquid reaction mass, containing the catalyst system in separation zone 16, can be recycled to reactor 10 via line 18.

Our invention can be utilized either in a batch operation or in a continuous operation wherein liquid reaction mass is continuously withdrawn from a carbonylation reactor and wherein stable catalyst is continuously recycled.

To further illustrate the advantages of our invention, the following examples are presented herewith. These examples should not be construed as unduly limiting the scope of our invention.

Example 1

Methanol was carbonylated in the presence of a catalyst system that formed on mixing rhodium iodide with methyl iodide in the presence of carbon monoxide and a 50% acetic acid and 50% water reaction medium. The apparatus utilized in this run was substantially the same apparatus as is presented in the figure. 240 gms./hr. of methanol were charged to reactor 10 through line 12. 290 gms./hr. of carbon monoxide were charged to the reactor through line 11. The reactor was maintained at a temperature of 175° C. and a pressure of 350 p.s.i.a. Unreacted carbon monoxide was withdrawn from the reactor through line 13 and passed to a flare. 3000 gms./hr. of liquid reaction mass was withdrawn from the reactor through line 14 and passed into separation zone 16. The pressure in separation zone 16 was essentially atmospheric and the liquid temperature was 104° C. No heat was added to transfer line 14 or separation zone 16. An overhead product containing 450 gms. of acetic acid per hour was removed from separation zone 16 through line 17. The liquid reaction mass residue, containing the homogeneous catalyst system was recirculated through line 18 to reactor 10. 2000 gms./hr. of unvaporized liquid reaction mass, containing the stable catalyst system passed through line 18. By monitoring the composition in reactor 10, it was found that there was no decrease in the amount of the active homogeneous catalyst system in the reactor when the system was run continuously for 200 hours.

Example 2

Another run was conducted utilizing an apparatus that consisted of a reactor similar to the one utilized in Example 1. In this run, the same amount of methanol and carbon monoxide were added to the reactor system containing the same catalyst as described in Example 1. 1500 gms./hr. of liquid reaction mass were withdrawn from the reactor through a transfer line and passed to a distillation column. The distillation column was operated with a bottoms temperature of 125° C. and at a pressure of essentially atmospheric pressure. 450 gms./hr. of acetic acid product were recovered from the overhead fraction of the column. The bottoms from the distillation column were recycled into the reactor at a rate of 500 gms./hr.

After operating this continuous process for 12 hours, catalyst decomposition in the base of the distillation column was observed. By continuously monitoring the catalyst present in the reactor, the active catalyst present in the reactor gradually decreased over a period of 21 hours until fresh catalyst had to be added to the reactor to maintain the carbonylation of methanol to produce acetic acid.

It is understood that various modifications can be made in the foregoing disclosure of our invention without departing from the spirit and scope of our invention.

What is claimed is:

1. In a carbonylation process wherein at least one reactant selected from the group consisting of an olefin, an alcohol, an ester derivative of said alcohol, a halide derivative of said alcohol and an ether derivative of said alcohol is reacted with carbon monoxide in a liquid phase in a reaction zone and in the presence of a catalyst system that contains (a) a rhodium or iridium component, and (b) an iodine or bromine component, the improvement which comprises passing at least a portion of the liquid reaction mass to a separation zone without the addition of heat, said separation zone having a pressure of at least 20 p.s.i. less than the pressure in said reaction zone, to vaporize at least a portion of the carbonylation products, withdrawing the vaporized carbonylation products and recycling the remaining liquid reaction mass to said reaction zone.

2. The process of Claim 1 wherein said reaction zone is maintained at a pressure of from about 50 to 1500 p.s.i.a.

3. The process of Claim 2 wherein the temperature in said reaction zone is from about 50 to 500° C.

4. The process of Claim 3 wherein the pressure in said separation zone is from about 0 to 1480 p.s.i.a.

5. The process of Claim 3 wherein an alcohol having the formula ROH wherein R is a hydrocarbon group of 1 to 20 carbon atoms is carbonylated with carbon monoxide in the presence of a rhodium and iodine containing catalyst system and said separation zone is maintained at a pressure of about 10 to 200 p.s.i.a.

6. The process of Claim 3 wherein an olefin having from 2 to 20 carbon atoms is carbonylated with carbon monoxide in the presence of a rhodium and iodine containing catalyst system and said separation zone is maintained at a pressure of about 10 to 200 p.s.i.a.

7. The process of Claim 5 wherein methanol is carbonylated in the presence of a catalyst system that contains rhodium and iodine components and said separation zone is maintained at a pressure of about 15 to 100 p.s.i.a.

8. The process of Claim 6 wherein ethylene is carbonylated in the presence of a catalyst system that contains rhodium and iodine components and said separation zone is maintained at a pressure of about 15 to 100 p.s.i.a.

9. The process of Claim 3 wherein said olefin has from 2 to 30 carbon atoms, said alcohol is an aliphatic glycol having 2 to 20 carbon atoms, an aromatic glycol having 6 to 20 carbon atoms or an alcohol having the formula ROH wherein R is a hydrocarbon radical of 1 to 20 carbon atoms, said ether has the formula R'—O—R' wherein R' is a hydrocarbon radical of 1 to 19 carbon atoms and the total number of carbon atoms in the compound does not exceed 20, said ester has the formula

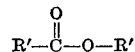

wherein R' is a hydrocarbon radical of 1 to 19 carbon atoms and the total number of carbon atoms in the compound does not exceed 20, and said halide has the formula R—X wherein R is a hydrocarbon radical of 1 to 20 carbon atoms and X is a halogen which is chlorine, bromine or iodine.

10. The process of Claim 9 wherein said catalyst system contains (a) a rhodium or iridium component and (b) an iodine component.

References Cited
UNITED STATES PATENTS

| | | | |
|---|---|---|---|
| 3,455,989 | 7/1969 | Kutepow et al. | 260—533 A X |
| 3,579,551 | 5/1971 | Craddock et al. | 260—533 A X |
| 3,579,552 | 5/1971 | Craddock et al. | 260—533 A X |
| 3,641,074 | 2/1972 | Fenton | 260—533 A X |
| 3,641,076 | 2/1972 | Booth | 260—533 A X |
| 3,663,613 | 5/1972 | Pai et al. | 260—533 A |

LORRAINE A. WEINBERGER, Primary Examiner

RICHARD D. KELLY, Assistant Examiner

U.S. Cl. X.R.

260—410.9 R, 413, 465.4, 468 M, 475 P, 476 R, 485 R, 488 K, 496, 514 M, 515 R, 533 A, 537 R, 544 A